United States Patent
Chang et al.

(10) Patent No.: US 6,476,141 B1
(45) Date of Patent: Nov. 5, 2002

(54) COMPATIBILIZED BLENDS OF ALKENYL AROMATIC POLYMERS, α-OLEFIN/VINYL OR VINYLIDENE AROMATIC AND/OR STERICALLY HINDERED ALIPHATIC OR CYCLOALIPHATIC VINYL OR VINYLIDENE INTERPOLYMERS AND STYRENIC BLOCK COPOLYMERS

(75) Inventors: Dane Chang, Sugarland, TX (US); Yunwa Wilson Cheung, Lake Jackson, TX (US); Charles F. Diehl, Lake Jackson, TX (US); Martin J. Guest, Lake Jackson, TX (US); Bharat I. Chaudhary, Pearland, TX (US); Andre J. Uzee, Baton Rouge, LA (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/965,274

(22) Filed: Sep. 27, 2001

Related U.S. Application Data

(60) Provisional application No. 60/236,670, filed on Sep. 29, 2000, and provisional application No. 60/266,272, filed on Feb. 2, 2001.

(51) Int. Cl.[7] .......................... C08L 23/00; C08L 25/08; C08L 33/04; C08L 35/02; C08L 47/00
(52) U.S. Cl. ...................... 525/191; 525/213; 525/216; 525/232; 525/238; 525/240; 525/241
(58) Field of Search ................................ 525/191, 213, 525/216, 232, 238, 240, 241

(56) References Cited

U.S. PATENT DOCUMENTS

| | | | |
|---|---|---|---|
| 4,076,698 A | | 2/1978 | Anderson et al. ......... 526/348.6 |
| 5,055,438 A | | 10/1991 | Canich ....................... 502/117 |
| 5,703,187 A | | 12/1997 | Timmers .................... 526/282 |
| 5,919,983 A | | 7/1999 | Rosen et al. .................... 568/3 |
| 6,087,447 A | * | 7/2000 | Stevens et al. .............. 521/139 |
| 6,150,297 A | | 11/2000 | Campbell, Jr. et al. ...... 502/152 |
| 6,166,145 A | * | 12/2000 | Guest et al. ................. 525/211 |
| 6,184,294 B1 | * | 2/2001 | Park et al. ................... 525/191 |
| 6,329,450 B1 | * | 12/2001 | Ogoe et al. .................. 524/109 |
| 6,362,270 B1 | * | 3/2002 | Chaudhary et al. .......... 524/515 |

FOREIGN PATENT DOCUMENTS

| | | |
|---|---|---|
| EP | 416 815 | 3/1991 |
| WO | WO 94/00500 | 1/1994 |
| WO | WO 95/32095 | 11/1995 |

OTHER PUBLICATIONS

J. C. Randall, Polymer Sequence Determination, Carbon–13 NMR Method, Academic Press New York, pp. 71–78, 1977.
Toru Arai et al., Polymer Preprints, vol. 39, No. 1, Mar. 1998.

\* cited by examiner

Primary Examiner—Nathan M. Nutter

(57) ABSTRACT

A blend composition (and fabricated articles therefrom) comprising;

(A) one or more alkenyl aromatic polymers;
(B) one or more substantially random interpolymers comprising
  (1) polymer units derived from;
    (a) at least one vinyl or vinylidene aromatic monomer, or
    (b) at least one hindered aliphatic or cycloaliphatic vinyl or vinylidene monomer, or
    (c) a combination of at least one aromatic vinyl or vinylidene monomer and at least one hindered aliphatic or cycloaliphatic vinyl or vinylidene monomer, and
  (2) polymer units derived from at least one of ethylene and/or a $C_{3-20}$ α-olefin; and
  (3) polymer units derived from one or more of ethylenically unsaturated polymerizable monomers other than those derived from (1) and (2); and,
(C) one or more compatibilizers;

and wherein said blend has;
  a) a tensile strength greater than 1500 psi;
  b) a pull force test (⅛" diameter) greater than 15 lb;
  c) a Shore A Hardness greater than 79;
  d) a cycle time in injection molding of less than 30 sec.

9 Claims, No Drawings

COMPATIBILIZED BLENDS OF ALKENYL AROMATIC POLYMERS, α-OLEFIN/VINYL OR VINYLIDENE AROMATIC AND/OR STERICALLY HINDERED ALIPHATIC OR CYCLOALIPHATIC VINYL OR VINYLIDENE INTERPOLYMERS AND STYRENIC BLOCK COPOLYMERS

CROSS-REFERENCE TO RELATED APPLICATIONS

This Application claims priority from U.S. Provisional Application No. 60/236,670 filed on Sep. 29$^{th}$, 2000, in the name of Dane Chang et al., and U.S. Provisional Application No. 60/266,272 filed on Feb. 2$^{nd}$, 2001 also in the name of Dane Chang et al., the entire contents of both of which are herein incorporated by reference.

STATEMENT REGARDING FEDERALLY SPONSORED RESEARCH OR DEVELOPMENT

Not Applicable

FIELD OF THE INVENTION

This invention relates to thermoplastic blends comprising one or more alkenyl aromatic polymers (Component A), one or more substantially random interpolymers (Component B) and one or more compatibilizers (Component C). Examples of such blends include blends of ethylene styrene interpolymers (ESI) and/or ethylene propylene styrene (EPS) interpolymers with polystyrene (PS) and/or high impact polystyrene (HIPS) compatibilzed with SBS (styrene-butadiene-styrene) or SIS (styrene-isoprene-styrene) or SEBS (styrene-ethylene-butylene-styrene) or SEPS (styrene-ethylene-propylene-styrene) block copolymers.

This technology enables the production of novel materials with a balance of flexibility, degree of hardness, modulus, short cycle times (injection molding), tensile strength, pull force strength and paintability.

BRIEF SUMMARY OF THE INVENTION

A blend composition (and fabricated articles therefrom) comprising;
(A) one or more alkenyl aromatic polymers;
(B) one or more substantially random interpolymers comprising
  (1) polymer units derived from;
    (a) at least one vinyl or vinylidene aromatic monomer, or
    (b) at least one hindered aliphatic or cycloaliphatic vinyl or vinylidene monomer, or
    (c) a combination of at least one aromatic vinyl or vinylidene monomer and at least one hindered aliphatic or cycloaliphatic vinyl or vinylidene monomer, and
  (2) polymer units derived from at least one of ethylene and/or a $C_{3-20}$ α-olefin; and
  (3) polymer units derived from one or more of ethylenically unsaturated polymerizable monomers other than those derived from (1) and (2); and,
(C) one or more compatibilizers;
and wherein said blend has;
  a) a tensile strength greater than 1500 psi;
  b) a pull force test (⅛" diameter) greater than 15 lb;
  c) a Shore A Hardness greater than 79;
  d) a cycle times in injection molding less than 30 sec.

DETAILED DESCRIPTION OF THE INVENTION

Definitions

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "hydrocarbyl" as employed herein means any aliphatic, cycloaliphatic, aromatic, aryl substituted aliphatic, aryl substituted cycloaliphatic, aliphatic substituted aromatic, or aliphatic substituted cycloaliphatic groups.

The term "hydrocarbyloxy" means a hydrocarbyl group having an oxygen linkage between it and the carbon atom to which it is attached.

The term "interpolymer" is used herein to indicate a polymer wherein at least two different monomers are polymerized to make the interpolymer. This includes copolymers, terpolymers, etc.

The term "block copolymer" is used herein to mean elastomers having at least one block segment of a hard polymer unit and at least one block segment of a rubber monomer unit. However, the term is not intended to include thermoelastic ethylene interpolymers which are, in general, random polymers. Preferred block copolymers contain hard segments of styrenic-type polymers in combination with saturated or unsaturated rubber monomer segments. The structure of the block copolymers useful in the present invention is not critical and can be of the linear or radial type, either diblock or triblock, or any combination of thereof.

Component A

For purposes of this invention, Component A is an alkenyl aromatic polymer which is a melt-processable polymer or melt processable impact-modified polymer in the form of polymerized vinyl aromatic monomers as represented by the structure:

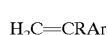

wherein R is hydrogen or an alkyl radical that preferably has no more than three carbon atoms and Ar is an aromatic group. R is preferably hydrogen or methyl, most preferably hydrogen. Aromatic groups Ar include phenyl and naphthyl groups. The aromatic group Ar may be substituted. Halogen (such as Cl, F, Br), alkyl (especially $C_1$–$C_4$ alkyl such as methyl, ethyl, propyl and t-butyl), $C_1$–$C_4$ haloalkyl (such as chloromethyl or chloroethyl) and alkoxyl (such as methoxyl or ethoxyl) substituents are all useful. Styrene, para-vinyl toluene, α-methyl styrene, 4-methoxy styrene, t-butyl styrene, chlorostyrene, vinyl naphthalene and the like are all useful vinyl aromatic monomers. Styrene is especially preferred.

The alkenyl aromatic polymer may be a homopolymer of a vinyl aromatic monomer as described above. Polystyrene homopolymers are the most preferred alkenyl aromatic polymers. Interpolymers of two or more vinyl aromatic monomers are also useful.

Although not critical, the alkenyl aromatic polymer may have a high degree of syndiotactic configuration; i.e., the aromatic groups are located alternately at opposite directions relative to the main chain that consists of carbon-carbon bonds. Homopolymers of vinyl aromatic polymers that have syndiotacticity of 75% r diad or greater or even 90% r diad or greater as measured by $^{13}$C NMR are useful herein.

The alkenyl aromatic polymer may also contain repeating units derived from one or more other monomers that are copolymerizable with the vinyl aromatic monomer. Suitable such monomers include N-phenyl maleimide; acrylamide; ethylenically unsaturated nitriles such as acrylonitrile and methacrylonitrile; ethylenically unsaturated carboxylic acids and anhydrides such as acrylic acid, methacrylic acid, fumaric anhydride and maleic anhydride; esters of ethylenically unsaturated acids such as $C_1$–$C_8$ alkyl acrylates and methacrylates, for example n-butyl acrylate and methyl methacrylate; and conjugated dienes such as butadiene or isoprene. The interpolymers of these types may be random, block or graft interpolymers. Blends of interpolymers of this type with homopolymers of a vinyl aromatic monomer can be used. For example, styrene/$C_4$–$C_8$ alkyl acrylate interpolymers and styrene-butadiene interpolymers are particularly suitable as impact modifiers when blended into polystyrene. Such impact-modified polystyrenes are useful herein.

In addition, the alkenyl aromatic polymers include those modified with rubbers to improve their impact properties. The modification can be, for example, through blending, grafting or polymerization of a vinyl aromatic monomer (optionally with other monomers) in the presence of a rubber compound. Examples of such rubbers are homopolymers of $C_4$–$C_6$ conjugated dienes such as butadiene or isoprene; ethylene/propylene interpolymers; interpolymers of ethylene, propylene and a nonconjugated diene such as 1,6-hexadiene or ethylidene norbornene; $C_4$–$C_6$ alkyl acrylate homopolymers or interpolymers, including interpolymers thereof with a $C_1$–$C_4$ alkyl acrylate. The rubbers are conveniently prepared by anionic solution polymerization techniques or by free radical initiated solution, mass or suspension polymerization processes. Rubber polymers that are prepared by emulsion polymerization may be agglomerated to produce larger particles having a multimodal particle size distribution.

Preferred impact modified alkenyl aromatic polymers are prepared by dissolving the rubber into the vinyl aromatic monomer and any comonomers and polymerizing the resulting solution, preferably while agitating the solution so as to prepare a dispersed, grafted, impact modified polymer having rubber domains containing occlusions of the matrix polymer dispersed throughout the resulting polymerized mass. In such products, polymerized vinyl aromatic monomer forms a continuous polymeric matrix. Additional quantities of rubber polymer may be blended into the impact modified polymer if desired.

Commercial PS (polystyrene), General purpose polystyrene (GPPS), HIPS (high impact polystyrene), ABS (acrylonitrile-butadiene-styrene) and SAN (styrene-acrylonitrile) resins that are melt processable are particularly useful in this invention.

Component B

The term "substantially random" (in the substantially random interpolymer comprising polymer units derived from ethylene and one or more α-olefin monomers with one or more vinyl or vinylidene aromatic monomers and/or aliphatic or cycloaliphatic vinyl or vinylidene monomers) as used herein means that the distribution of the monomers of said interpolymer can be described by the Bernoulli statistical model or by a first or second order Markovian statistical model, as described by J. C. Randall in *POLYMER SEQUENCE DETERMINATION, Carbon*-13 *NMR Method*, Academic Press New York, 1977, pp. 71–78. Preferably, substantially random interpolymers do not contain more than 15 percent of the total amount of vinyl aromatic monomer in blocks of vinyl aromatic monomer of more than 3 units. More preferably, the interpolymer is not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

The interpolymers used to prepare the injection molded articles of the present invention include the substantially random interpolymers prepared by polymerizing i) ethylene and/or one or more ox-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s). Suitable α-olefins include for example, α-olefins containing from 3 to about 20, preferably from 3 to about 12, more preferably from 3 to about 8 carbon atoms. Particularly suitable are ethylene, propylene, butene-1,4-methyl-1-pentene, hexene-1 or octene-1 or ethylene in combination with one or more of propylene, butene- 1,4-methyl-1-pentene, hexene-1 or octene-1. These α-olefins do not contain an aromatic moiety.

Other optional polymerizable ethylenically unsaturated monomer(s) include norbornene and $C_{1-10}$ alkyl or $C_{6-10}$ aryl substituted norbornenes, with an exemplary interpolymer being ethylene/styrene/norbornene.

Suitable vinyl or vinylidene aromatic monomers which can be employed to prepare the interpolymers include, for example, those represented by the following formula:

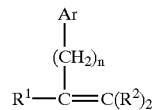

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary vinyl aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl- ($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl monomer is styrene.

By the term "sterically hindered aliphatic or cycloaliphatic vinyl or vinylidene compounds", it is meant addition polymerizable vinyl or vinylidene monomers corresponding to the formula:

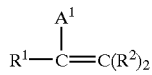

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. Preferred aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred aliphatic or cycloaliphatic vinyl or vinylidene compounds are the various isomeric vinyl- ring substituted derivatives of cyclohexene and substituted cyclohexenes, and 5-ethylidene-2-norbornene. Especially suitable are 1-, 3-, and 4-vinylcyclohexene. Simple linear non-branched α-olefins including for example, α-olefins containing from 3 to about 20 carbon atoms such as propylene, butene-1,4-methyl-1-pentene, hexene-1 or octene-1 are not examples of sterically hindered aliphatic or cycloaliphatic vinyl or vinylidene compounds.

One method of preparation of the substantially random interpolymers includes polymerizing a mixture of polymerizable monomers in the presence of one or more metallocene or constrained geometry catalysts in combination with various cocatalysts, as described in EP-A-0,416,815 by James C. Stevens et al. and U.S. Pat. No. 5,703,187 by Francis J. Timmers, both of which are incorporated herein by reference in their entirety. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts, co catalysts, and methods for preparing the substantially random interpolymers are disclosed in U.S. application Serial No. 702,475, filed May 20, 1991 (EP-A-514,828); as well as U.S. Pat. Nos.: 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; 5,721,185, 5,919,983 and 6,150,297, all of which patents and applications are incorporated herein by reference.

The substantially random α-olefin/vinyl aromatic interpolymers can also be prepared by the methods described in JP 07/278230 employing compounds shown by the general formula

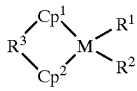

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$).

The substantially random α-olefin/vinyl aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,869 filed Sep. 4, 1996 and WO 98/09999 both by Francis J. Timmers et al. These interpolymers contain additional signals in their carbon-13 NMR spectra with intensities greater than three times the peak to peak noise. These signals appear in the chemical shift range 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

Further preparative methods for the interpolymers used in the present invention have been described in the literature. Longo and Grassi (*Makromol. Chem.*, Volume 191, pages 2387 to 2396 [19901]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am. Chem. Soc., Div. Polym. Chem.*) Volume 35, pages 686,687 [1994]) have reported copolymerization using a $MgCl_2/TiCl_4/NdCl_3/Al(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiCl_4/NdCl_3/MgCl_2/Al(Et)_3$ catalyst. Sernetz and Mulhaupt, (*Macromol. Chem. Phys.*, v. 197, pp. 1071–1083, 1997) have described the influence of polymerization conditions on the copolymerization of styrene with ethylene using $Me_2Si(Me_4Cp)(N$-tert-butyl$)TiCl_2$/methylaluminoxane Ziegler-Natta catalysts. Copolymers of ethylene and styrene produced by bridged metallocene catalysts have been described by Arai, Toshiaki and Suzuki (*Polymer Preprints, Am. Chem. Soc., Div. Polym. Chem.*) Volume 38, pages 349, 350 [1997]) and in U.S. Pat. No. 5,652,315, issued to Mitsui Toatsu Chemicals, Inc. The manufacture of α-olefin/vinyl aromatic monomer interpolymers such as propylene/styrene and butene/styrene are described in U.S. Pat. No. 5,244,996, issued to Mitsui Petrochemical Industries Ltd or U.S. Pat. No. 5,652,315 also issued to Mitsui Petrochemical Industries Ltd or as disclosed in DE 197 11 339 A1 to Denki Kagaku Kogyo KK. All the above methods disclosed for preparing the interpolymer component are incorporated herein by reference. The random copolymers of ethylene and styrene as disclosed in Polymer Preprints Vol 39, No. 1, March 1998 by Toru Aria et al. can also be employed as blend components for the injection molded articles of the present invention.

While preparing the substantially random interpolymer, an amount of atactic vinyl aromatic homopolymer may be formed due to homopolymerization of the vinyl aromatic monomer at elevated temperatures. The presence of vinyl aromatic homopolymer is in general not detrimental for the purposes of the present invention and can be tolerated. The vinyl aromatic homopolymer may be separated from the interpolymer, if desired, by extraction techniques such as selective precipitation from solution with a non solvent for either the interpolymer or the vinyl aromatic homopolymer. For the purpose of the present invention it is preferred that no more than 30 weight percent, preferably less than 20 weight percent based on the total weight of the interpolymers of atactic vinyl aromatic homopolymer is present.

Component C (Compatibilizer)

Suitable unsaturated block copolymers include those represented by the following formulas:

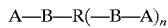
Formula I or

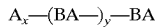
Formula II wherein each A is a polymer block comprising a vinyl aromatic monomer, preferably styrene, and each B is a polymer block comprising a conjugated diene, preferably isoprene or butadiene, and optionally a vinyl aromatic monomer, preferably styrene; R is the remnant of a multifunctional coupling agent; n is an integer from 1 to 5; x is zero or 1; and y is a real number from zero to 4.

The preparation of the block copolymers useful herein is not the subject of the present invention. Methods for the preparation of such block copolymers are known in the art. Suitable catalysts for the preparation of useful block copolymers with unsaturated rubber monomer units include lithium based catalysts and especially lithium-alkyls. U.S. Pat. No. 3,595,942 describes suitable methods for hydrogenation of block copolymers with unsaturated rubber monomer units to from block copolymers with saturated rubber monomer units. The structure of the polymers is determined by their methods of polymerization. For example, linear polymers result by sequential introduction of the desired rubber monomer into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the block copolymers with unsaturated rubber monomer units of three or more. Coupling may be effected with multifunctional coupling agents such as dihaloalkanes or alkenes and divinyl benzene as well as with certain polar compounds such as silicon halides, siloxanes or esters of monohydric alcohols with carboxylic acids. The presence of any coupling residues in the polymer may be ignored for an adequate description of the block copolymers forming a part of the composition of this invention.

Suitable block copolymers having unsaturated rubber monomer units includes, but is not limited to, styrene-butadiene (SB), styrene-isoprene(SI), styrene-butadiene-styrene (SBS), styrene-isoprene-styrene (SIS), α-methylstyrene-butadiene-α-methylstyrene and α-methylstyrene-isoprene-α-methylstyrene.

The styrenic portion of the block copolymer is preferably a polymer or interpolymer of styrene and its analogs and homologs including α-methylstyrene and ring-substituted styrenes, particularly ring-methylated styrenes. The preferred styrenics are styrene and a-methylstyrene, and styrene is particularly preferred.

Block copolymers with unsaturated rubber monomer units may comprise homopolymers of butadiene or isoprene or they may comprise copolymers of one or both of these two dienes with a minor amount of styrenic monomer.

Preferred block copolymers with saturated rubber monomer units comprise at least one segment of a styrenic unit and at least one segment of an ethylene-butene or ethylene-propylene copolymer. Preferred examples of such block copolymers with saturated rubber monomer units include styrene/ethylene-butene copolymers, styrene/ethylene-propylene copolymers, styrene/ethylene-butene/styrene (SEBS) copolymers, styrene/ethylene-propylene/styrene (SEPS) copolymers.

Hydrogenation of block copolymers with unsaturated rubber monomer units is preferably effected by use of a catalyst comprising the reaction products of an aluminum alkyl compound with nickel or cobalt carboxylates or alkoxides under such conditions as to substantially completely hydrogenate at least 80 percent of the aliphatic double bonds while hydrogenating no more than 25 percent of the styrenic aromatic double bonds. Preferred block copolymers are those where at least 99 percent of the aliphatic double bonds are hydrogenated while less than 5 percent of the aromatic double bonds are hydrogenated.

The proportion of the styrenic blocks is generally between 8 and 65 percent by weight of the total weight of the block copolymer. Preferably, the block copolymers contain from 10 to 35 weight percent of styrenic block segments and from 90 to 65 weight percent of rubber monomer block segments, based on the total weight of the block copolymer.

The average molecular weights of the individual blocks may vary within certain limits. In most instances, the styrenic block segments will have number average molecular weights in the range of 5,000 to 125,000, preferably from 7,000 to 60,000 while the rubber monomer block segments will have average molecular weights in the range of 10,000 to 300,000, preferably from 30,000 to 150,000. The total average molecular weight of the block copolymer is typically in the range of 25,000 to 250,000, preferably from 35,000 to 200,000.

Further, the various block copolymers suitable for use in the present invention may be modified by graft incorporation of minor amounts of functional groups, such as, for example, maleic anhydride by any of the methods well known in the art.

Block copolymers useful in the present invention are commercially available, such as, for example, supplied by Shell Chemical Company under the designation of KRATON™ and supplied by Dexco Polymers under the designation of VECTOR™.

Also suitable as compatibilizers are high styrene content substantially ramdom interpolymers having Additives such as antioxidants (e.g., hindered phenolics (e.g., Irganox® 1010), phosphites (e.g., Irgafos® 168)), cling additives (e.g., PIB), antiblock additives, colourants, pigments, fillers, and the like can also be included in the present compositions, to the extent that they do not interfere with the enhanced properties discovered by Applicants.

The compositions of the present invention are compounded by any convenient method, including dry blending the individual components and subsequently melt mixing, either directly in the extruder or mill used to make the finished article (e.g., the automotive part), or by pre-melt mixing in a separate extruder or mill (e.g., a Banbury mixer).

There are many types of molding operations which can be used to form useful fabricated articles or parts from the present compositions, including various injection molding processes (e.g., that described in Modern Plastics Encyclopedia/89, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in Modem Plastics Encyclopedia/89, Mid October 1988 Issue, Volume 65, Number 11, pp. 217–218, "Extrusion-Blow Molding", the disclosure of which is incorporated herein by reference) and profile extrusion.

Some of the fabricated articles include toys, sports articles, containers such as for food or other household articles, footwear, automotive articles, such as soft facia, sealants and assembly adhesives.

Properties of the Interpolymers and Blend Compositions of the Present Invention

The blends comprise:

1) greater than about 20, preferably of from about 20 to about 70, most preferably of from about 25 to about 55 weight %, (based on the combined weights of substantially random interpolymer, the alkenyl aromatic homopolymers or copolymer and the compatibilizer) of one or more alkenyl aromatic polymers (Component A);

2) of from about 20 to about 70, preferably of from about 25 to about 65, most preferably of from about 30 to about 60 weight % (based on the combined weights of substantially random interpolymer, the alkenyl aromatic homopolymers or copolymer and the compatibilizer) of one or more substantially random interpolymers (Component B); and 3) of from about 1 to about 30, preferably of from about 5 to about 25, most preferably of from about 10 to about 20 weight % (based on the combined weights of substantially random interpolymer, the alkenyl aromatic homopolymers or copolymer and the compatibilizer) of one or more compatibilizers (Component C).

The molecular weight (Mw) of the alkenyl aromatic homopolymers or copolymers used to prepare the blends of the present invention is from about 100,000 to about 500,000, preferably from about 120,000 to about 350,000, more preferably 130,000 to 325,000.

The alkenyl aromatic polymer material used to prepare the blends of the present invention comprises greater than 50 and preferably greater than 70 weight percent alkenyl aromatic monomeric units. More preferably, the alkenyl aromatic polymer material is comprised entirely of alkenyl aromatic monomeric units. Most preferably the alkenyl aromatic polymer material is General Purpose Polystyrene (GPPS) or High Impact Polystyrene (HIPS).

Component B comprises substantially random interpolymers of α-olefin monomers, vinyl aromatic monomers and, optionally, additional comonomers including ethylene/styrene copolymers and terpolymers with α-olefins (especially propylene). The substantially random interpolymers contain from about 0.5 to 15, preferably from about 3 to about 10, more preferably from about 5 to about 8 mole percent of at least one vinyl or vinylidene aromatic monomer and/or aliphatic or cycloaliphatic vinyl or vinylidene monomer and from about 85 to about 99.5, preferably from about 90 to about 97, more preferably from about 92 to about 95 mole percent of ethylene and/or at least one aliphatic α-olefin having from 3 to about 20 carbon atoms.

Component C comprises styrene block copolymers with greater than 20, preferably 25–60 and most preferably 30–50 weight percent styrene; and/or substantially random interpolymers with 10–39, preferably 15–33, most preferably 17–31 mole percent vinyl aromatic monomer, with the proviso that the substantially random interpolymer compatibilizer is other than that used as Component B.

The blends of this invention may be processed by any known fabrication techniques (including, but not limited to, injection molding, compression molding, extrusion, calendering, thermoforming and foaming) to produce articles of suitable morphology that exhibit the following properties:

Tensile strength greater than 1500, preferably >1700, most preferably >1900 psi

Pull force test (⅛" diameter): >15, preferably >17, more preferably >21, even more preferably >30, most preferably >40 lb Shore A Hardness greater than 79, preferably >82 and most preferably >84

Cycle times in injection molding: <30, preferably <28, most preferably <26 sec

Paintable score of 5 according to ASTM Method D-3359.

The melt index ($I_2$) of the substantially random interpolymers used to prepare the blends of the present invention is from about 0.01 to about 1000, preferably of from about 0.3 to about 30, more preferably of from about 0.5 to about 10 g/10 min.

The molecular weight distribution ($M_w/M_n$) of the substantially random interpolymer used to prepare the blends of the present invention is from about 1.5 to about 20, preferably of from about 1.8 to about 10, more preferably of from about 2 to about 5.

In addition, minor amounts of alkenyl aromatic homopolymers or copolymers having a molecular weight of about 2,000 to about 50,000, preferably from about 4,000 to about 25,000 can be added in an amount not exceeding about 20 wt % (based on the combined weights of substantially random interpolymer and the various alkenyl aromatic homopolymers or copolymers).

The following examples are illustrative of the invention, but are not to be construed as to limiting the scope thereof in any manner.

EXAMPLES

Test Methods a) Melt Flow Measurements

The molecular weight of the substantially random interpolymers used in the present invention is conveniently indicated using a melt index measurement according to ASTM D-1238, Condition 190° C./2.16 kg (formally known as "Condition (E)" and also known as $I_2$) was determined. Melt index is inversely proportional to the molecular weight of the polymer. Thus, the higher the molecular weight, the lower the melt index, although the relationship is not linear.

b) Styrene Analyses

Interpolymer styrene content and atactic polystyrene concentration can be determined using proton nuclear magnetic resonance ($^1$H NMR) or by $^{13}$C nuclear magnetic resonance.

All proton NMR samples were prepared in 1,1,2,2-tetrachloroethane-$d_2$ (TCE-$d_2$). The resulting solutions were 1.6–3.2 percent polymer by weight. Melt index ($I_2$) was used as a guide for determining sample concentration. Thus when the $I_2$ was greater than 2 g/10 min, 40 mg of interpolymer was used; with an $I_2$ between 1.5 and 2 g/10 min, 30 mg of interpolymer was used; and when the $I_2$ was less than 1.5 g/10 min, 20 mg of interpolymer was used. The interpolymers were weighed directly into 5 mm sample tubes. A 0.75 mL aliquot of TCE-$d_2$ was added by syringe and the tube was capped with a tight-fitting polyethylene cap. The samples were heated in a water bath at 85° C. to soften the interpolymer. To provide mixing, the capped samples were occasionally brought to reflux using a heat gun.

Proton NMR spectra were accumulated on a Varian VXR 300 with the sample probe at 80° C., and referenced to the residual protons of TCE-$d_2$ at 5.99 ppm. The delay times were varied between 1 second, and data was collected in triplicate on each sample. The following instrumental conditions were used for analysis of the interpolymer samples:

Varian VXR-300, standard $^1H$:

Sweep Width, 5000 Hz

Acquisition Time, 3.002 sec

Pulse Width, 8 $\mu$sec

Frequency, 300 MHz

Delay, 1 sec

Transients, 16

The total analysis time per sample was about 10 minutes.

Initially, a $^1H$ NMR spectrum for a sample of the polystyrene, STYRON™ 680 (available from the Dow Chemical Company, Midland, Mich.) was acquired with a delay time of one second. The protons were "labeled": b, branch; a, alpha; o, ortho; m, meta; p, para, as shown in Figure 1.

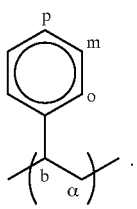

Figure 1

Integrals were measured around the protons labeled in Figure 1; the 'A' designates aPS. Integral $A_{7.1}$ (aromatic, around 7.1 ppm) is believed to be the three ortho/para protons; and integral $A_{6.6}$ (aromatic, around 6.6 ppm) the two meta protons. The two aliphatic protons labeled α resonate at 1.5 ppm; and the single proton labeled b is at 1.9 ppm. The aliphatic region was integrated from about 0.8 to 2.5 ppm and is referred to as $A_{al}$. The theoretical ratio for $A_{7.1}:A_{6.6}:A_{al}$ is 3:2:3, or 1.5:1:1.5, and correlated very well with the observed ratios for the Styron™ 680 sample for several delay times of 1 second. The ratio calculations used to check the integration and verify peak assignments were performed by dividing the appropriate integral by the integral $A_{6.6}$ Ratio $A_r$ is $A_{7.1}/A_{6.6}$.

Region $A_{6.6}$ was assigned the value of 1. Ratio Al is integral $A_{al}/A_{6.6}$. All spectra collected have the expected 1.5:1:1.5 integration ratio of (o+p): m: (α+b). The ratio of aromatic to aliphatic protons is 5 to 3. An aliphatic ratio of 2 to 1 is predicted based on the protons labeled α and b respectively in Figure 1. This ratio was also observed when the two aliphatic peaks were integrated separately.

For the ethylene/styrene interpolymers, the $^1H$ NMR spectra using a delay time of one second, had integrals $C_{7.1}$, $C_{6.6}$, and $C_{al}$ defined, such that the integration of the peak at 7.1 ppm included all the aromatic protons of the copolymer as well as the o & p protons of aPS. Likewise, integration of the aliphatic region $C_{al}$ in the spectrum of the interpolymers included aliphatic protons from both the aPS and the interpolymer with no clear baseline resolved signal from either polymer. The integral of the peak at 6.6 ppm $C_{6.6}$ is resolved from the other aromatic signals and it is believed to be due solely to the aPS homopolymer (probably the meta protons). (The peak assignment for atactic polystyrene at 6.6 ppm (integral $A_{6.6}$) was made based upon comparison to the authentic sample STYRON™ 680.) This is a reasonable assumption since, at very low levels of atactic polystyrene, only a very weak signal is observed here. Therefore, the phenyl protons of the copolymer must not contribute to this signal. With this assumption, integral $A_{6.6}$ becomes the basis for quantitatively determining the aPS content.

The following equations were then used to determine the degree of styrene incorporation in the ethylene/styrene interpolymer samples:

(C Phenyl)=$C_{7.1}+A_{7.1}-(1.5 \times A_{6.6})$ (C Aliphatic)=$C_{al}-(1.5 \times A_{6.6})$ $S_c$=(C Phenyl)/5

$e_c$=(C Aliphatic-(3×$s_c$))/4

$E=e_c/(e_c+s_c)$ $S_c=s_c/(e_c+s_c)$ and the following equations were used to calculate the mol % ethylene and styrene in the interpolymers.

$$Wt \% \ E = \frac{E*28}{(E*28)+(S_c*104)}(100)$$

and $$Wt \% \ S = \frac{S_c*104}{(E*28)+(S_c*104)}(100)$$

where: $s_c$ and $e_c$ are styrene and ethylene proton fractions in the interpolymer, respectively, and $S_c$ and E are mole fractions of styrene monomer and ethylene monomer in the interpolymer, respectively.

The weight percent of aPS in the interpolymers was then determined by the following equation:

$$Wt \% \ aPS = \frac{(Wt \% \ S)*\left(\frac{A_{6.6}/2}{S_c}\right)}{100+\left[(Wt \% \ S)*\left(\frac{A_{6.6}/2}{S_c}\right)\right]}*100$$

The total styrene content was also determined by quantitative Fourier Transform Infrared spectroscopy (FTIR).

Preparation of Ethylene/Styrene Interpolymers Used in Examples and Comparative Experiments of Present Invention ESI 1 and EPS-1 are substantially random interpolymers prepared using the following polymerization procedure.

ESI 1 and EPS 1 were prepared in a continuously operating loop reactor. An Ingersoll-Dresser twin screw pump provided the mixing. The reactor ran liquid full at 475 psig (3,275 kPa). Raw materials and catalyst/cocatalyst flows were fed into the reactor through injectors and Kenics static mixers in the loop reactor piping. From the discharge of the loop pump, the process flow goes through two shell and tube heat exchangers before returning to the suction of the loop pump. Upon exiting the last exchanger, loop flow returned through the injectors and static mixers to the suction of the pump. A second monomer/feed injector and mixer was used if available. Heat transfer oil or tempered water was circulated through the exchangers' jacket to control the loop temperature. The exit stream of the loop reactor was taken off between the two exchangers. The flow and solution density of the exit stream was measured by a Micro-Motion™ mass flow meter.

Solvent was injected to the reactor primarily as part of the feed flow to keep the ethylene in solution. A split stream from the pressurization pumps prior to ethylene injection was taken to provide a flush flow for the loop reactor pump seals. Additional solvent is added as a diluent for the catalyst Feed solvent was mixed with uninhibited styrene monomer on the suction side of the pressurization pump. The pressurization pump supplied solvent and styrene to the reactor at approximately 650 psig (4,583 kPa). Fresh styrene flow was measured by a Micro-Motion™ mass flow meter, and total solvent/styrene flow was measured by a separate Micro-Motion™ mass flow meter. Ethylene was supplied to the reactor at approximately 690 psig (4,865 kPa). The ethylene stream was measured by a Micro-Motion™ mass flow meter. A flow meter/controller was used to deliver hydrogen into the ethylene stream at the outlet of the ethylene control valve.

The ethylene/hydrogen mixture is at ambient temperature when it is combined with the solvent/styrene stream. The temperature of the entire feed stream as it entered the reactor loop was lowered to approximately 2° C. by a glycol cooled exchanger. Preparation of the three catalyst components took place in three separate tanks. Fresh solvent and concentrated catalyst/cocatalyst/secondary co-catlayst premix were added and mixed into their respective run tanks and fed into the reactor via a variable speed Pulsafeeder™ diaphragm pumps. As previously explained, the three component catalyst system entered the reactor loop through an injector and static mixer into the suction side of the twin screw pump. The raw material feed stream was also fed into the reactor loop through an injector and static mixer upstream of the catalyst injection point or through a feed injector/mixer between the two exchangers, if available.

Polymerization was stopped with the addition of catalyst kill (water) into the reactor product line after the Micro-Motion™ mass flow meter measuring the solution density. A static mixer in the line provided dispersion of the catalyst kill and additives in the reactor effluent stream. This stream next entered post reactor heaters that provided additional energy for the solvent removal flash. This flash occurred as the effluent exited the post reactor heater and the pressure was dropped from 475 psig (3,275 kPa) down to approximately 450 mmHg (60 kPa) of absolute pressure at the reactor pressure control valve.

This flashed polymer entered the devolatilization section of the process. The volatiles flashing from the devolatilization were condensed with a glycol jacketed exchanger, passed through vacuum pump, and were discharged to vapor/liquid separation vessel. In the first stage vacuum system, solvent/styrene were removed from the bottom of this vessel as recycle solvent while unreacted ethylene exhausted from the top. The ethylene stream was measured with a Micro-Motion™ mass flow meter. The measurement of vented ethylene plus a calculation of the dissolved gases in the solvent/styrene stream were used to calculate the ethylene conversion. The polymer and remaining solvent was pumped with a gear pump to a final devolatilizer. The pressure in the second devolatilizer was operated at approximately 10 mmHg (1.4 kPa) absolute pressure to flash the remaining solvent. The dry polymer (<1000 ppm total volatiles) was pumped with a gear pump to an underwater pelletizer with spin-dried, and collected. The preparation conditions for each sample are summarized in Table 1.

TABLE 1

| | Preparation Conditions for ESI 1 and EPS 1 | | | | | | | | | | |
|---|---|---|---|---|---|---|---|---|---|---|---|
| ESI # | Reactor Temp ° C. | Solvent Flow lb/hr | Ethylene Flow lb/hr | Propylene Flow lb/hr | Hydrogen Flow lb/hr | Styrene Flow lb/hr | Ethylene Conversion % | B/Ti Ratio | MMAO[e]/Ti Ratio | Co-Catalyst | Catalyst |
| ESI 1 NK02029 33A- | 115 | 21000 | 3120 | N/A | 0.37 | 1480 | 94 | 5.4 | 8.2 | A[a] | C[c] |
| EPS 1 382600 0529- 1900 | 130 | 725 | 100 | 6 | 0.009 | 46 | 89 | 1.2 | 10 | B[b] | D[d] |

[a]Catalyst A is (1H-cyclopenta[1]phenanthrene-2-yl)dimethyl(t-butylamido)-silanetitanium 1,4-diphenylbutadiene) prepared as described in Example 3 of U.S. Pat. No. 6,150,297, incorporated herein by reference.

[b]Catalyst B is ;(1H-cyclopenta[1]phenanthrene-2-yl)dimethyl(t-butylamido)-silanetitanium dimethyl) prepared as described in Example 2 of U.S. Pat. No. 6,150,297, incorporated herein by reference.

[c]Cocatalyst C is tris(pentafluorophenyl)borane, (CAS# 001109-15-5)

[d]Cocatalyst D is bis(hydrogenated-tallowalkyl)methylammonium tetrakis(pentafluorophenyl)borate prepared as described in Example 2 of U.S. Pat. No. 5,919,983 incorporated herein by reference.

[e]a modified methylaluminoxane commercially available from Akzo Nobel as MMAO-3A (CAS# 146905-79-5)

TABLE 2

| Designation | Melt Flow Rate (dg/min) | Copolymer styrene (wt %) | Copolymer styrene (mol %) | Copolymer ethylene (wt %) | Copolymer propylene (wt %) |
|---|---|---|---|---|---|
| ESI-1 | 10* | 30 | 10 | 70 | — |
| SBS-VECTOR ™ 6241 (SBS 1) | 8* | 43 | — | — | 43 |
| SBS-SINGAPRENE ™ (SBS 2) | 20* | 43 | — | — | — |
| PS-STYRON ™* 666D (PS) | 8** | >97 | — | — | >97 |
| STYRON ™470 (HIPS) | 3** | — | — | — | — |
| EPS-1 | 10* | 24 | — | 71.4 | 4.6 |

*ASTM D1238 (190° C./2 Kg),
**ASTM D1238 (200° C./5 Kg)
STYRON is a product and registered trademark of The Dow Chemical Company.
VECTOR is a product and registered trademark of Dexco Polymers
SINGAPRENE is a product and registered trademark of Singapore Plastics.

Blends of ethylene styrene interpolymers (ESI 1) or ethylene propylene styrene interpolymers (EPS 1) and polystrene (PS or HIPS) compatibilized with SBS block copolymer were injection molded.

Compounding: ESI, or EPS1, SBS and PS or HIPS were first dry blended at certain weight ratios the compounded using a typical single screw (general purpose) extruder (2.5") equipped with a under-water pelletizer under the following conditions:

Zone temperature 400° F., Melt temperature 410° F., Die temperature 400° F., Adapter temperature 400° F., Underwater cut water temperature: 70° F., Output 250–300 pounds/hr, Residence Time 2 minutes Injection Molding: A 150 tons DEMAG injection molding machine was used. The typical molding conditions include:

Injection pressure: 1200–1500 psi, Injection time: 1–2 seconds, Hold pressure: 300–500 psi, Hold time: 2–5 seconds, Cooling time: 3–10 seconds Tensile Test: Tensile Bar made according to ASTM Method 638 was used for measurement of ultimate tensile strength, yield tensile, % elongation.

Pull Force Test: The ⅛" I.D. arm from a popular injection molded Disney character Mickey Mouse was used for pull force evaluation. Mickey Mouse made from various developmental toy resins as well as competitors were tested on a standard Pull Force Gauge (Master Carr, 0–50 pounds at ½ pound increments).

Paint Stripping Test: Two types of paint (ESI and TPE based—5 colors each) from Rainbow Forest, China are used. Toy parts are first spray painted, cure overnight, marked with sharp blade at 3 different locations (25 squares each), and then subjected to stripping with a adhesive tape. The number of squares stripped with the tape was used to determine how good the paint adheres to the toy. A score of 5 means no square was stripped.

Cycle Time: The cycle time required to injection mold, without distortion, a popular McDonald toy character HAMBURGLAR™ was used to compare various developmental toy resins and to the competitors. This mold was chosen due to its relatively thick body, which requires longer cycle time.

TABLE 3

Comparative Examples of ESI/HIPS blends (no SBS)*

| Comp Ex | Blend Composition | Tensile Strength (psi) | Arm pull force* (lb) | Cycle time** (sec) | Paintability |
|---|---|---|---|---|---|
| #1 | 100 wt % ESI | 1632 | 20 | >40 | 5 |
| #2 | 90 wt % ESI/10 wt % HIPS | 1507 | 17 | >40 | 5 |
| #3 | 80 wt % ESI/20 wt % HIPS | 1190 | 17 | >40 | 5 |
| #4 | 70 wt % ESI/30 wt % HIPS | 1080 | 17 | >40 | 5 |
| #5 | 60 wt % ESI/40 wt % HIPS | 1036 | 18 | 37–40 | 5 |
| #6 | 50 wt % ESI/50 wt % HIPS | 1000 | 22 | 33–37 | 5 |

*Examples #1–#6, demonstrate the poor compatibility between ESI and HIPS. As more HIPS were added (e.g. from 0 to 50%) into the ESI 1, the lower the tensile strength of the blends (e.g. from 1632 to 1000 psi).

TABLE 4

Comparative Examples of ESI/SBS blend (no PS)*

| Comp Ex | Blend Composition | Tensile Strength (psi) | Arm pull force* (lb) | Cycle time** (sec) | Paintability |
|---|---|---|---|---|---|
| #7 | 50 wt % ESI/50 wt % SBS1 | 2594 | — | 22 | 5 |

*Example #7 demonstrates the good compatability between ESI and SBS. As 50% SBS were added into ESI 1, the tensile strength increased to 2594 psi.

TABLE 5

Comparative Example of SBS/HIPS blend (no ESI)*

| Comp Ex | Blend Composition | Tensile Strength (psi) | Arm pull force* (lb) | Cycle time** (sec) | Paintability |
|---|---|---|---|---|---|
| #8 | 50 wt % SBS2/50 wt % HIPS | 2603 | — | 37 | 4 |

Example #8 demonstrates the good compatibility between SBS and HIPS. As 2603 psi tensile strength were achieved with a 50/50 SBS and HIPS blend. The co-continuous phases observed from TEM confirmed the good compatibilities between ESI & SBS, as well as between SBS & HIPS.

TABLE 6

Comparative Examples of ESI/PS blends (no SBS)*

| Comp Ex | Blend Composition | Tensile Strength (psi) | Arm pull force* (lb) | Cycle time** (sec) | Paintability |
|---|---|---|---|---|---|
| #9 | 100 wt % ESI | 1632 | 20 | >40 | 5 |
| #10 | 90 wt % ESI/10 wt % PS | 1607 | 19 | >40 | 5 |
| #11 | 80 wt % ESI/20 wt % PS | 1301 | 17 | >40 | 5 |
| #12 | 70 wt % ESI/30 wt % PS | 1205 | 17 | 37–40 | 5 |
| #13 | 60 wt % ESI/40 wt % PS | 907 | 17 | 35–38 | 5 |
| #14 | 50 wt % ESI/50 wt % PS | 808 | 19 | 33–36 | 5 |

*These data demonstrate the poor compatibility between ESI and PS. As 10–50% PS were added to ESI 1, the tensile strength decreased from 1607 (#10) to 808 psi (#14).

TABLE 7

Examples of ESI/SBS/HIPS blends:*

| Ex | Blend Composition | Tensile Strength (psi) | Arm pull force* (lb) | Cycle time** (sec) | Paintability |
|---|---|---|---|---|---|
| Comp Ex #15 | 50 wt % ESI/0 wt % SBSI/50 wt % HIPS | 1000 | 22 | 32–35 | 5 |
| #1 | 40 wt % ESI/10 wt % SBS1/50 wt % HIPS | 2220 | 39 | 20–22 | 5 |
| #2 | 35 wt % ESI/15 wt % SBS1/50 wt % HIPS | 2300 | 38 | 17–18 | 5 |
| #3 | 30 wt % ESI/20 wt % SBS1/50 wt % HIPS | 2363 | 44 | 17–18 | 5 |
| Comp Ex #16 | 60 wt % ESI/0 wt % SBS1/40 wt % HIPS | 1036 | 18 | 22–25 | 5 |
| #4 | 50 wt % ESI/10 wt % SBS1/40 wt % HIPS | 1641 | 28 | 22–25 | 5 |
| #5 | 45 wt % ESI/15 wt % SBS1/40 wt % HIPS | 1922 | 33 | 17–18 | 5 |
| #6 | 40 wt % ESI/20 wt % SBS1/40 wt % HIPS | 1929 | 35 | 17–18 | 5 |
| #7 | 35 wt % ESI/25 wt % SBS1/40 wt % HIPS | 2060 | 38 | 17–18 | 5 |

*Examples 1–3 demonstrate the effectiveness of SBS as compatibilizer between ESI and HIPS at 50 wt. % HIPS level. As 10% SBS were added to a ESI/HIPS blend, the tensile strength more than doubled from 1000 to 2220 psi. As the SBS concentrations continue increased to 15% & 20%, the tensile strength increased to 2300 & 2363 psi, respectively. Examples #4–7 demonstrate the effectiveness of SBS as compatibilizer between ESI and HIPS at 40 wt % HIPS level. As seen, as the SBS increased from 10% to 25%, the tensile strength increased from 1641 (#4) to 2060 psi (#7), respectively.

TABLE 8

Examples of ESI/SBS/PS blends:*

| Ex | Blend Composition | Tensile Strength (psi) | Arm pull force* (lb) | Cycle time** (sec) | Paintability |
|---|---|---|---|---|---|
| Comp Ex #17 | 50 wt % ESI/0 wt % SBS1/50 wt % PS | 808 | 19 | 33–36 | 5 |
| #8 | 45 wt % ESI/5 wt % SBS1/50 wt % PS | 1789 | 33 | 22–25 | 5 |
| #9 | 40 wt % ESI/10 wt % SBS1/50 wt % PS | 2053 | 52 | 17–18 | 5 |
| #10 | 37.5 wt % ESI/12.5 wt % SBS1/50 wt % PS | 2389 | 56 | 17–18 | 5 |

TABLE 8-continued

Examples of ESI/SBS/PS blends:*

| Ex | Blend Composition | Tensile Strength (psi) | Arm pull force* (lb) | Cycle time** (sec) | Paintability |
|---|---|---|---|---|---|
| #11 | 30 wt % ESI/20 wt % SBS1/50 wt % PS | 2445 | 58 | 17–18 | 5 |
| Comp Ex #18 | 60 wt % ESI/0 wt % SBS1/40 wt % PS | 907 | 17 | 35–38 | 5 |
| #12 | 50 wt % ESI/10 wt % SBS1/40 wt % PS | 2022 | 42 | 17–18 | 5 |
| #13 | 48 wt % ESI/12 wt % SBS1/40 wt % PS | 2213 | 47 | 17–18 | 5 |
| #14 | 45 wt % ESI/15 wt % SBS1/40 wt % PS | 2261 | 48 | 17–18 | 5 |
| #15 | 40 wt % ESI/20 wt % SBS1/40 wt % PS | 2169 | 46 | 17–18 | 5 |
| #16 | 35 wt % ESI/25 wt % SBS1/40 wt % PS | 2287 | 48 | 17–18 | 5 |

*Examples #8–11 demonstrate the effectiveness of SBS as compatibilizer between ESI and PS at 50 wt. % PS level. With only 5% SBS addition, the tensile strength more than doubled from 808 (#17) to 1789 psi (#8). The tensile strength continue increasing to 2445 psi as the SBS increased to 20% (#11). Examples #12–#16 demonstrate the effectiveness of SBS as compatibilizer between ESI and PS at 40 wt. % PS level. With 10% SBS addition, the tensile strength increased from 907 (#18) to 2022 psi (#12). The tensile strength continued to increase to 2287 psi as 25% PS was added (#16).
In regard to the "Arm Pull Force Test", as the tensile strength increases, the arm pull force also increases responsively in all cases shown above. In terms of "Cycle Time", as seen in the examples above, when SBS was used as compatibilizer, the cycle time of the blends were significantly reduced.

TABLE 9

Example of EPS/SBS/PS blends

| Ex | Blend Composition | Tensile Strength (psi) | Arm pull force* (lb) | Cycle time** (sec) | Paintability |
|---|---|---|---|---|---|
| Comp Ex #19 | 100 wt % EPS | 1432 | 18 | >40 | 5 |
| #17 | 40 wt % EPS/10 wt % SBS1/50 wt % PS | 2268 | 50 | 17–18 | 5 |
| #18 | 48 wt % EPS/12 wt % SBS1/40 wt % PS | 1936 | 44 | 17–18 | 5 |

What is claimed is:

1. A blend composition comprising;
(A) one or more alkenyl aromatic polymers;
(B) one or more substantially random interpolymers comprising
   (1) from about 0.5 to about 15 mol percent of polymer units derived from;
      (a) at least one vinyl or vinylidene aromatic monomer, or
      (b) at least one hindered aliphatic or cycloaliphatic vinyl or vinylidene monomer, or
      (c) a combination of at least one aromatic vinyl or vinylidene monomer and at least one hindered aliphatic or cycloaliphatic vinyl or vinylidene monomer, and
   (2) from about 85 to about 99.5 mol percent polymer units derived from at least one of ethylene and/or a $C_{3-20}$ α-olefin; and
   (3) from 0 to about 20 mol percent of polymer units derived from one or more of ethylenically unsaturated polymerizable monomers other than those derived from (1) and (2); and,
(C) one or more compatibilizers;
and wherein said blend has;
   a) a tensile strength greater than 1500 psi;
   b) a pull force test (⅛" diameter) greater than 15 lb;
   c) a Shore A Hardness greater than 79;
   d) a cycle time in injection molding of less than 30 sec.
2. The blend composition of claim 1 wherein;
A) Component A is present in an amount of from about 20 to about 70 percent by weight (based on the combined weights of Components A, B and C;
B) Component B is present in an amount of from about 20 to about 70 percent by weight (based on the combined weights of Components A, B and C;
C) Component C is present in an amount of from about 1 to about 30 percent by weight (based on the combined weights of Components A, B and C)
and wherein said blend has;
   a) a tensile strength greater than 1700 psi;
   b) a pull force test (⅛" diameter) greater than 17 lb;
   c) a Shore A Hardness greater than 82; and
   d) a cycle time in injection molding of less than 28 sec.
3. The blend composition of claim 1 wherein;
A) Component A is selected from the group consisting of GPPS (general purpose polystyrene) and HIPS (high impact polystyrene);
B) Component B is selected from the group consisting of substantially random ethylene/styrene and ethylene/propylene/styrene interpolymers; and;
C) Component C is selected from the group consisting of SBS (styrene-butadiene-styrene) or SIS (styrene-isoprene-styrene) or SEBS (styrene-ethylene-butylene-styrene) or SEPS (styrene-ethylene-propylene-styrene) block copolymers or a substantially random interpolymer other than that of Component B;
and wherein said blend has;
   a) a tensile strength greater than 1900 psi;
   b) a pull force test (⅛" diameter) greater than 21 lb;
   c) a Shore A Hardness greater than 84; and
   d) a cycle time in injection molding of less than 26 sec.
4. The blend of claim 3 wherein said pull force test is greater than 40 lb.
5. An injection molded article having a paintability score of 5 (according to ASTM Method D-3359), prepared from a blend composition comprising;
(A) one or more alkenyl aromatic polymers;
(B) one or more substantially random interpolymers comprising (1) from about 0.5 to about 15 mol percent of polymer units derived from;
  (a) at least one vinyl or vinylidene aromatic monomer, or
  (b) at least one hindered aliphatic or cycloaliphatic vinyl or vinylidene monomer, or
  (c) a combination of at least one aromatic vinyl or vinylidene monomer and at least one hindered aliphatic or cycloaliphatic vinyl or vinylidene monomer, and
(2)) from about 85 to about 99.5 mol percent of polymer units derived from at least one of ethylene and/or a $C_{3-20}$ α-olefin; and
(3)) from 0 to about 20 mol percent of polymer units derived from one or more of ethylenically unsaturated polymerizable monomers other than those derived from (1) and (2); and,
(C) one or more compatibilizers;
and wherein said blend has;
  a) a tensile strength greater than 1500 psi;
  b) a pull force test (1/8" diameter) greater than 15 lb;
  c) a Shore A Hardness greater than 79;
  d) a cycle times in injection molding of less than 30 sec.

6. The injection molded article of claim 5 wherein;
  A) said Component A is present in an amount of from about 20 to about 70 percent by weight (based on the combined weights of Components A, B and C;
  B) said Component B is present in an amount of from about 20 to about 70 percent by weight (based on the combined weights of Components A, B and C; and
  C) said Component C is present in an amount of from about 1 to about 30 percent by weight (based on the combined weights of Components A, B and C)

and wherein said blend has;
  a) a tensile strength greater than 1700 psi;
  b) a pull force test (1/8" diameter) greater than 17 lb;
  c) a Shore A Hardness greater than 82; and
  d) a cycle time in injection molding of less than 28 sec.

7. The injection molded article of claim 5 wherein
  A) said Component A is selected from the group consisting of GPPS (general purpose polystyrene) and HIPS (high impact polystyrene);
  B) said Component B is selected from the group consisting of substantially random ethylene/styrene and ethylene/propylene/styrene interpolymers; and;
  C) said Component C is selected from the group consisting of SBS (styrene-butadiene-styrene) or SIS (styrene-isoprene-styrene) or SEBS (styrene-ethylene-butylene-styrene) or SEPS (styrene-ethylene-propylene-styrene) block copolymers or a substantially random interpolymer other than that of Component B;
and wherein said blend has;
  a) a tensile strength greater than 1900 psi;
  b) a pull force test (1/8" diameter) greater than 21 lb;
  c) a Shore A Hardness greater than 84; and
  d) a cycle time in injection molding of less than 26 sec.

8. The injection molded article of claim 7 wherein said pull force test is greater than 40 lb.

9. The injection molded article of claim 5 in the form of a toy, sports article, food container, household article, footware, automotive article, or an assembly adhesive.

* * * * *